(12) United States Patent
Fulgosi

(10) Patent No.: US 7,665,485 B2
(45) Date of Patent: Feb. 23, 2010

(54) HATCH FOR THE OPENING AND CLOSING OF PRESSURISED PIPES, IN PARTICULAR FOR THE OPENING AND CLOSING OF BRANCH PIPES FOR THE INTRODUCTION OF PIPE CLEANING AND INSPECTION APPARATUS

(75) Inventor: Davide Fulgosi, S. Nicolo (IT)

(73) Assignee: Fulgosi S.r.l., San Nicolo (PC) (IT)

( * ) Notice: Subject to any disclaimer, the term of this patent is extended or adjusted under 35 U.S.C. 154(b) by 207 days.

(21) Appl. No.: 11/730,208

(22) Filed: Mar. 30, 2007

(65) Prior Publication Data
US 2007/0227393 A1 Oct. 4, 2007

(30) Foreign Application Priority Data
Apr. 3, 2006 (IT) .............................. PC060005 U

(51) Int. Cl.
*F16L 55/10* (2006.01)
(52) U.S. Cl. .................... 138/89; 138/92; 138/96 R; 220/323; 220/321; 292/49; 292/256.59
(58) Field of Classification Search .................. 138/89, 138/92, 96 R; 220/323, 321; 292/49, 256.67, 292/256.69
See application file for complete search history.

(56) References Cited

U.S. PATENT DOCUMENTS

| | | | | |
|---|---|---|---|---|
| 1,673,011 | A | | 6/1928 | Mauser |
| 2,721,094 | A | * | 10/1955 | Webster .................. 292/256.69 |
| 3,074,591 | A | * | 1/1963 | Raver .......................... 220/327 |
| 3,155,116 | A | * | 11/1964 | Ver Nooy ..................... 138/89 |
| 3,667,649 | A | * | 6/1972 | Thillet .......................... 220/323 |
| 3,765,456 | A | * | 10/1973 | Karpenko ..................... 138/89 |
| 3,766,947 | A | * | 10/1973 | Osburn ......................... 138/89 |
| 4,102,474 | A | * | 7/1978 | Platts .......................... 220/323 |
| 4,140,240 | A | * | 2/1979 | Platts .......................... 220/323 |
| 4,144,909 | A | * | 3/1979 | Harrison ....................... 138/94 |

(Continued)

FOREIGN PATENT DOCUMENTS

EP 0 129 349 12/1984

(Continued)

OTHER PUBLICATIONS

European Search Report dated Jul. 18, 2007.

*Primary Examiner*—Patrick F Brinson
(74) *Attorney, Agent, or Firm*—Young & Thompson

(57) ABSTRACT

A closing system for pressurized pipes, includes an annular supporting structure, designed to be secured to one end of the pipe, a closing hatch mounted on the annular support, and elements for locking the hatch including a locking ring inserted into an annular cavity in the support to lock the hatch, wherein the inside edge of the hatch is tapered to form an inclined wall for coupling to a corresponding inclined wall in the annular support. The collapsible ring includes a number of sectors, one of which is fixed and integral with the hatch, while the others are hinged to the adjacent sectors, so that they can rotate on a plane parallel with the hatch until they exit from the annular seating and allow the hatch to open. The hatch is opened and closed simply by rotating it around a hinge.

4 Claims, 4 Drawing Sheets

SECTION F-F

U.S. PATENT DOCUMENTS

| | | | |
|---|---|---|---|
| 4,315,577 A * | 2/1982 | Bernson, Jr. | 220/323 |
| 4,387,740 A * | 6/1983 | Vanzant | 138/89 |
| 4,693,278 A * | 9/1987 | Wilson et al. | 138/89 |
| 5,848,616 A * | 12/1998 | Vogel et al. | 138/89 |
| 6,286,553 B1 * | 9/2001 | Morgan | 138/89 |
| 6,439,415 B1 * | 8/2002 | Salim et al. | 220/323 |
| 2005/0161957 A1 | 7/2005 | McGuire | |

FOREIGN PATENT DOCUMENTS

| | | |
|---|---|---|
| EP | 129349 A2 * | 12/1984 |
| WO | 02/097319 | 12/2002 |

* cited by examiner

HATCH FOR THE OPENING AND CLOSING OF PRESSURISED PIPES, IN PARTICULAR FOR THE OPENING AND CLOSING OF BRANCH PIPES FOR THE INTRODUCTION OF PIPE CLEANING AND INSPECTION APPARATUS

FIELD OF THE INVENTION

This invention relates to a hatch designed for the opening and closing of pressurised pipes, and in particular for the opening and closing of "traps".

BACKGROUND OF THE INVENTION

Traps are branch pipes on pipelines which are used to introduce self-propelled devices known as "pigs" that advance inside the pipeline to perform cleaning and inspection operations and are recovered at the outlet after travelling through the pipeline.

The hatch according to the invention comprises an annular supporting structure designed to be welded or connected to one end of the branch pipe, a closing hatch mounted on said annular support, and means that lock the hatch in the closing position constituted by a collapsible ring, designed to fit into an annular cavity in said support in order to lock the hatch in the closing position, wherein the inside edge of said hatch is tapered to form an inclined wall designed to couple to a corresponding inclined wall in said annular support.

These characteristics enable the hatch to be opened and closed simply by rotating it around a hinge, with no need for a combined movement consisting of a traverse along the axis followed by rotation, as in other known systems.

Self-propelled devices called "pigs" are used for the purpose of inspection, control and cleaning of large pipes such as gas pipelines.

Said pigs are inserted into the pipelines and travel along them, sometimes for miles, performing a series of operations ranging from photographing the interior of the pipeline and storing the images to inspections designed to check for corroded parts or cracks in the pipeline, and cleaning of its inner surface.

Said devices, which have a diameter of several tens of centimeters, depending on the inner diameter of the pipe, and a length of up to 2-3 meters. are introduced into the pipes and travel along them, sometimes for miles, before being recovered through branch pipes.

SUMMARY OF THE INVENTION

The invention relates to the hatches used to close said branch pipes, which consist of pipes a few meters long used to introduce the devices into the pipelines, where the pressure is often several hundred atmospheres.

For this reason the branch pipes must be closed with hatches that offer suitable safety guarantees and a perfect seal.

European patent 0 129 349 describes a closing device, in particular for a pressurised pipe, comprising a hatch which is inserted into the opening of an annular support welded to the end of the pipe.

A locking element in the form of a annular elastic band locks it into position; said element is inserted in an annular seating bounded on one side by the outer surface of the hatch and on the other by an undercut in said annular support.

When said elastic band is inserted into the seating, a gap remains between its ends which is filled by manually inserting a completion element until the whole circumference is covered.

This system is effective, but is rather complex to manufacture and somewhat laborious to use.

To open the hatch, it must first be slid axially to remove it from its seating and then rotated to complete its opening.

Moreover, operation of the elastic locking band is not very easy, and requires some strength.

Said drawbacks are remedied by the present invention, which relates to a hatch for closing pressurised pipes, of the type comprising an annular supporting structure on which a closing hatch is mounted, wherein the hatch has a tapered inner edge that forms an inclined wall which allows the hatch to be opened and closed simply by rotating it around its hinge, with no need for a combined movement of traverse along the axis followed by rotation, and wherein the locking device consists of a collapsible annular band consisting of a number of sectors hinged together, which can be moved easily, rapidly and effortlessly, from a locking position in which the band acquires an annular configuration and is inserted between the hatch and an undercut in the annular support, and an opening position in which it is collapsed, with the various parts rotating in relation to one another to move towards the centre of the hatch, thus being released from their seating and allowing the hatch to open.

BRIEF DESCRIPTION OF THE DRAWINGS

This invention will be better understood from the detailed description that follows, provided by way of example but not of limitation, by reference to the annexed figures wherein.

DETAILED DESCRIPTION OF EMBODIMENTS

Figure 2:
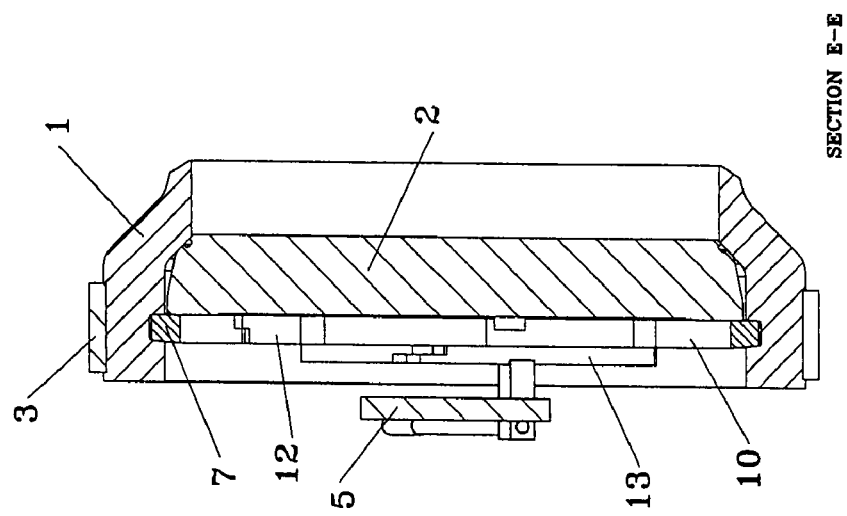
FIG. 2 is a cross-section along line E-E in FIG. 1.
Figure 7:
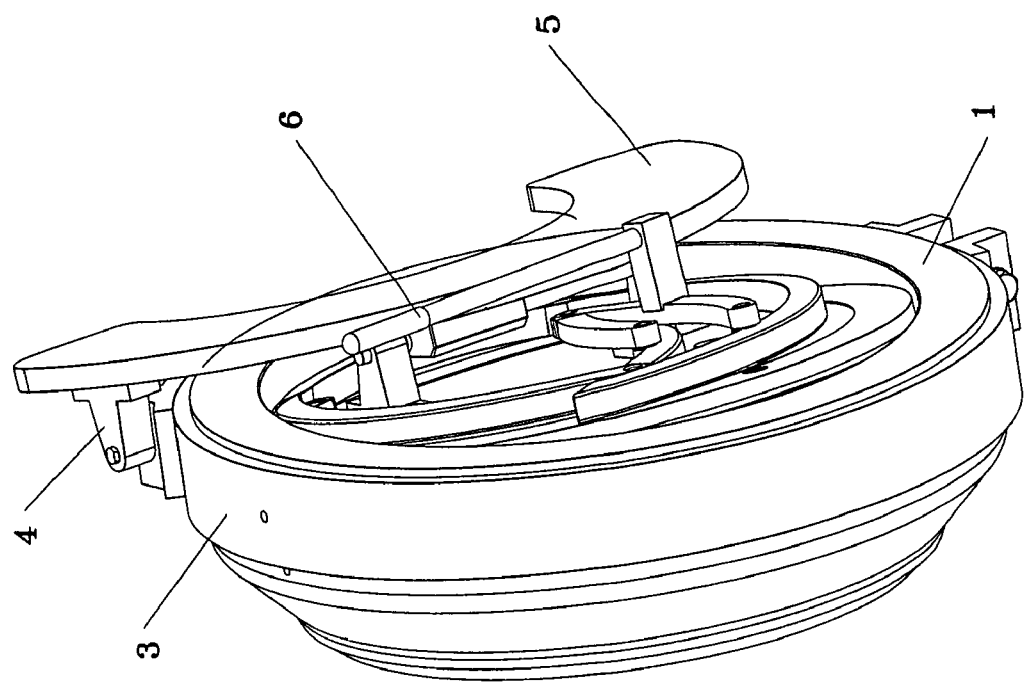

As shown in FIGS. 2 and 7, the closing system according to the invention comprises an annular support 1, designed to be welded to the end of a pipe which is closed by a hatch 2.

The inside of the hatch is tapered to form an inclined wall 17, preferably inclined by approx. 45°, so that the hatch can rotate without interfering with the inner wall of support 1. Number 3 indicates a steel band which is tightened around annular body 1.

A pair of hinges 4 and a handle 5 for opening the hatch are connected to said band. Handle 5 is connected to the hatch via a further hinge 6.

Annular stop means or locking ring 7, which will be described in greater detail below, is partly inserted into a groove 8 in the inner surface of support 1 (FIG. 8), in contact with hatch 2.

Figure 8:
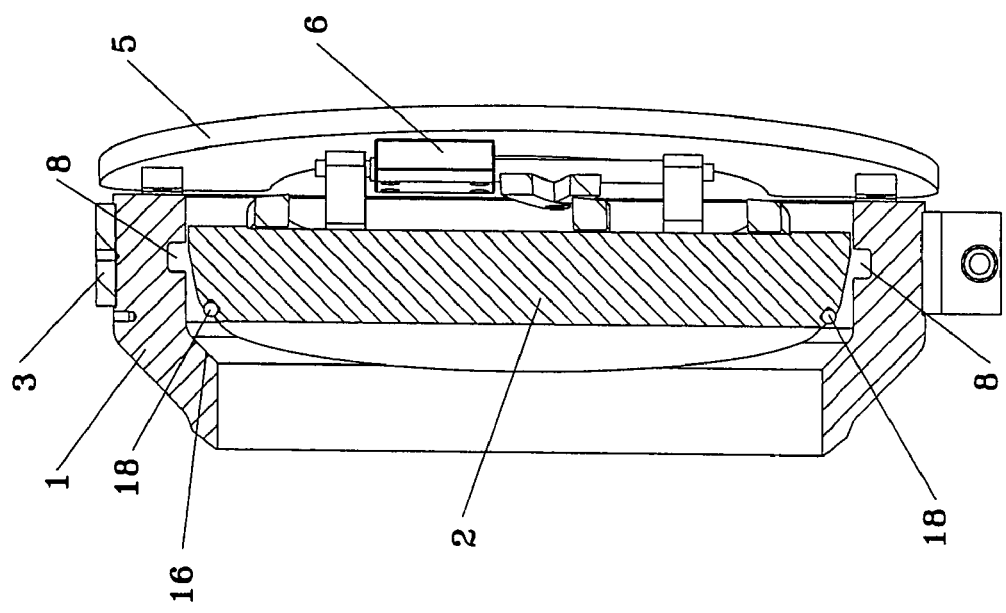
FIGS. 7 and 8 are further views of the hatch, in perspective view and cross-section respectively.

Locking ring 7 then locks hatch 2 in the closed position, as clearly shown in FIG. 8.

Figure 6:
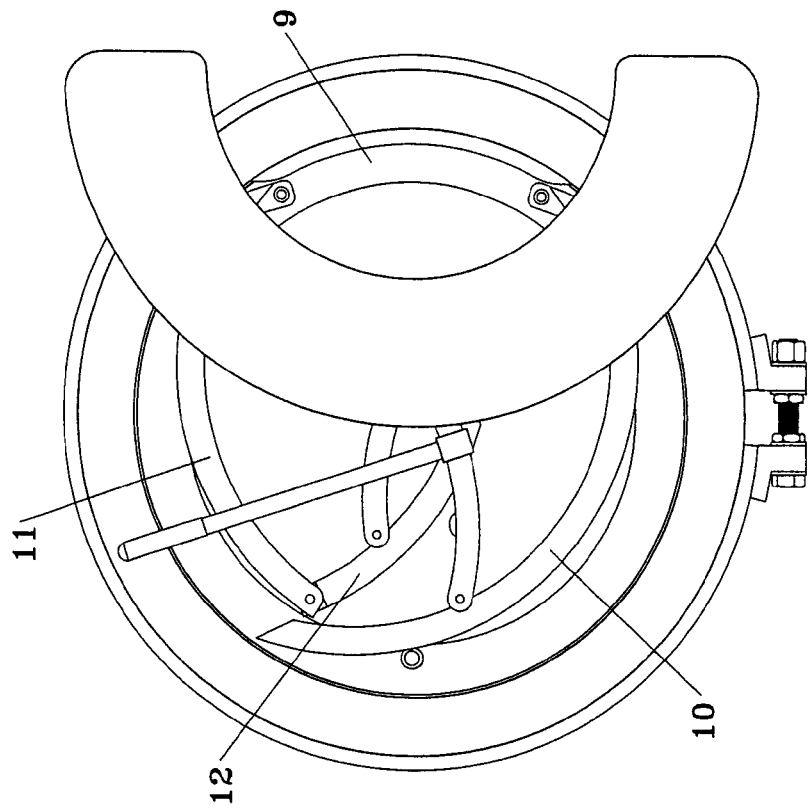
FIGS. 5 and 6 are front views of the hatch according to the invention, during two successive locking stages.

Locking ring 7 (shown in FIGS. 3, 5 and 6) consists of different sectors hinged together, to make the ring collapsible.

A first sector 9, integral with hatch 2, is inserted into groove 8 when the hatch is closed. This sector, of limited size, is positioned substantially in correspondence with the hinge of the hatch.

A sector 10 is hinged to one side of sector 9, and two other sectors 11 and 12, hinged together, are hinged to the other side of sector 9.

Figure 1:
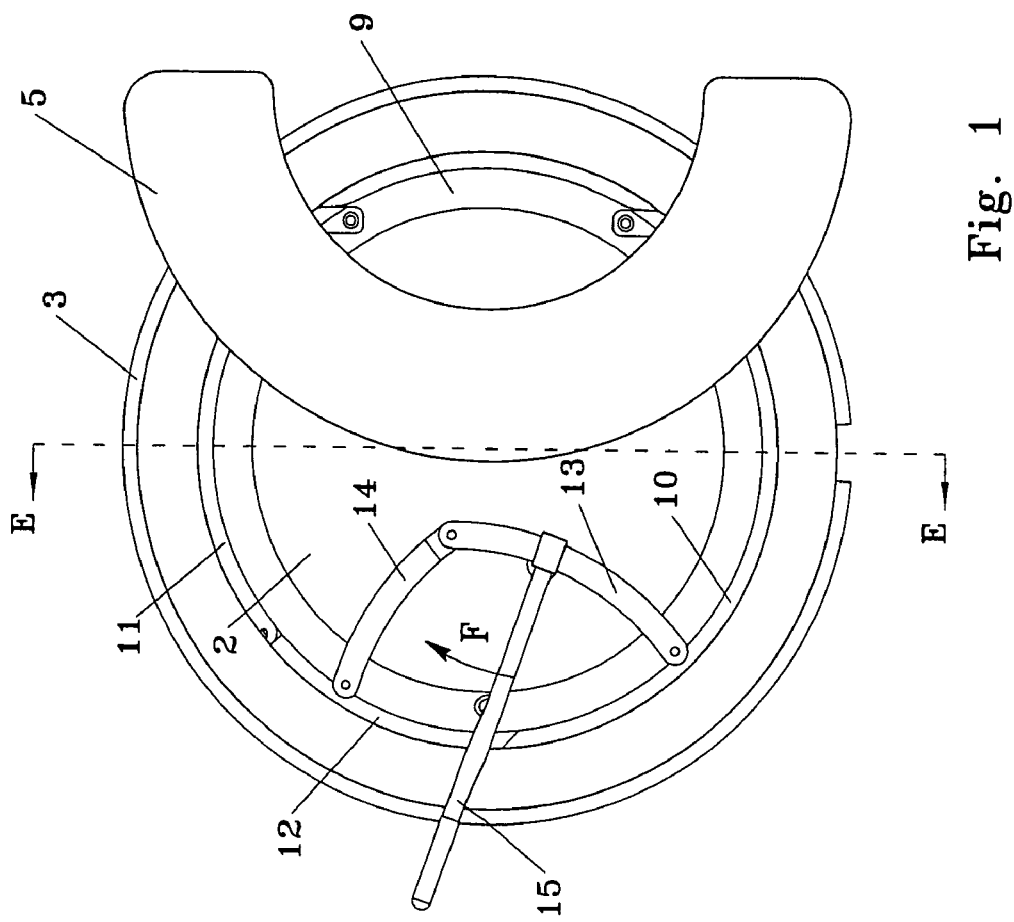
FIG. 1 is a front view of the hatch according to the invention in the closed position.
Figure 4:
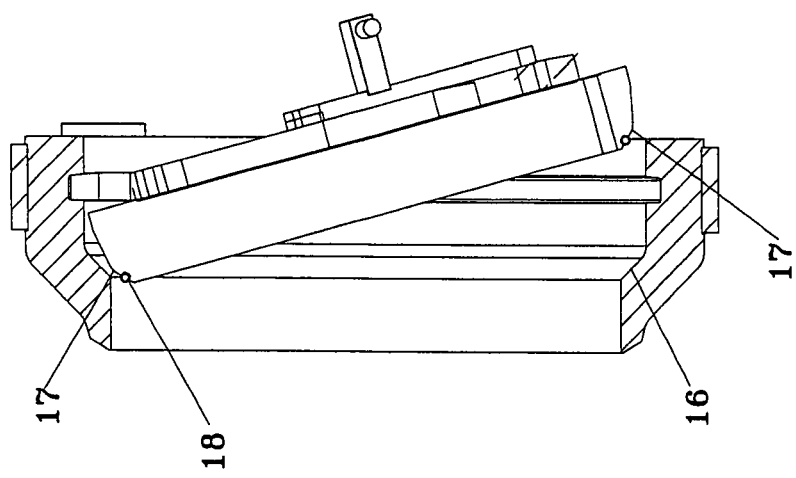
FIG. 4 is a cross-section along line F-F in FIG. 3.
Figure 3:
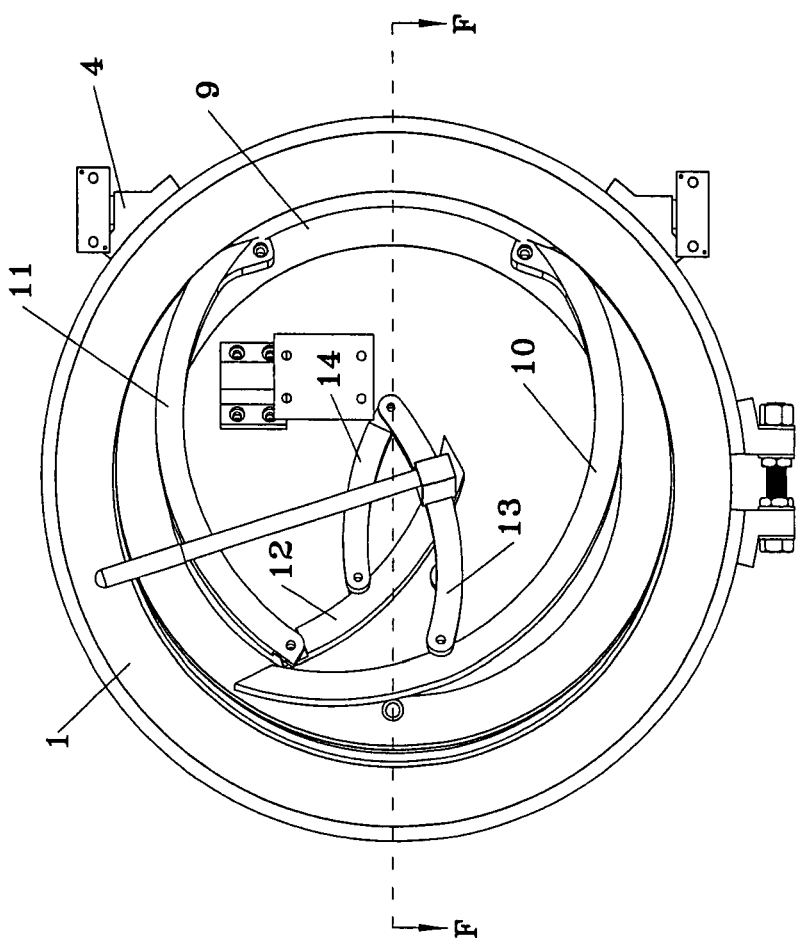
FIG. 3 is a view of the hatch in the open position.

Sectors 10 to 12 can rotate, moving from the position illustrated in FIG. 1, in which they are inserted in seating 8 acquiring the closed ring configuration illustrated in the figure, to a collapsed position, in which they exit from seating 8 to allow opening of the hatch, for example in the position illustrated in FIG. 3.

A pair of connecting rods 13 and 14, hinged together, are hinged to end sectors 10 and 12, and a lever 15 that operates the device is attached to one of said connecting rods (in the figure to connecting rod 13).

The device operates as follows.

The hatch is normally closed, and locked in this position by locking ring 7, which consists of sectors 9-12, inserted in seating 8.

Locking ring 7 projects from the seating, in contact with the outer surface of hatch 2, as shown in FIG. 2, locking it in this position and preventing it from opening. To open the hatch and access the pipe, the hatch must first be released by removing ring 7.

Figure 5:
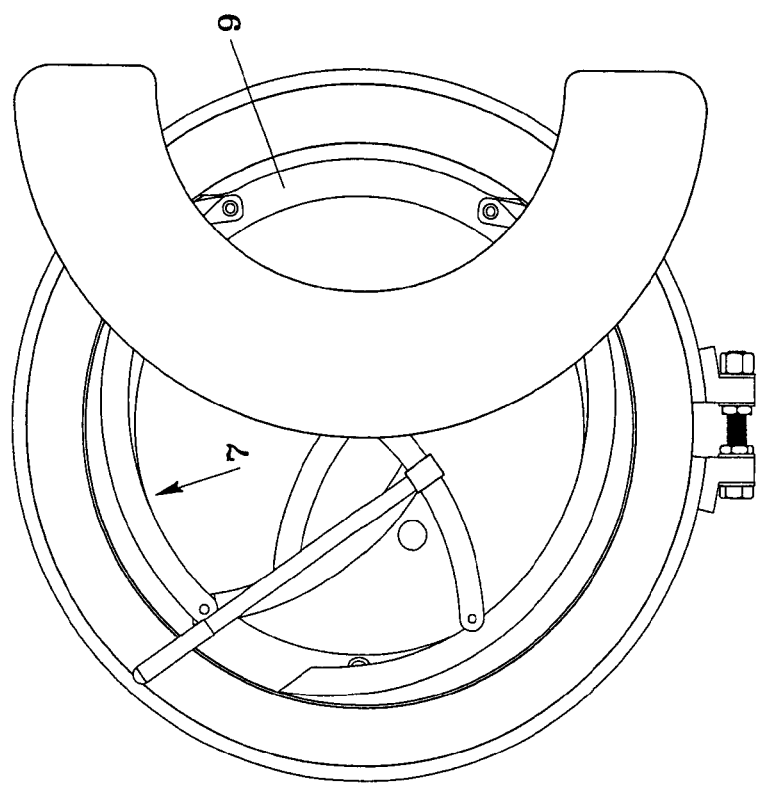

For this purpose lever 15 is turned in the direction of arrow F in FIG. 1. This will control the rotation of connecting rods 13 and 14 which move closer together, as shown in FIG. 5, pulling with them sectors 10 and 12 which exit from their seatings.

As the rotation continues (FIG. 6) sector 11 will also be pulled out of its seating and the position in which the hatch is fully locked will be reached, as shown in FIG. 3.

At this point the hatch can be opened simply by rotating it round its hinge. This is possible because the inside of the hatch is tapered to form an inclined wall 17, preferably inclined by approx. 45°, so that the hatch can rotate without interfering with the inner wall of support 1.

To close the hatch it is sufficient to turn it in the opposite direction, in order to move inclined wall 17 with the corresponding inclined wall 16 of ring 1, thus compressing seal 18.

Lever 15 is then turned in the opposite direction until sectors 9 to 12 have returned into seating 8, and the locking element returns to its annular shape and projects from the seating in contact with the outer wall of the hatch, thus preventing the hatch from opening.

The result is a closing system which is simple to make and particularly practical to use. The sizes and the materials employed can obviously vary, depending on use.

The invention claimed is:

1. A closing system for pressurised pipes, comprising:
   an annular supporting structure, to be welded or secured to one end of a pressurized pipe,
   a closing hatch pivotally mounted on said annular supporting structure,
   means designed to lock said hatch in a closing position, said means consisting of a locking ring inserted into an annular cavity in said support to lock the hatch,
   said closing hatch having an inner wall designed to couple to a corresponding wall in said annular supporting structure, a seal being mounted on said inner wall of the closing hatch, or on said corresponding wall of said of said annular supporting structure,
   said inner wall of said closing hatch and said corresponding wall of said annular supporting structure are inclined by 45° and are configured so that said closing hatch pivots open and closed only by rotation.

2. The closing system as claimed in claim 1, wherein said locking ring is a collapsible locking ring mounted on the outer wall of the hatch, said collapsible locking ring comprising a plurality of sectors, one of said sectors is fixed and integral with the hatch, and others of said sectors are hinged to adjacent ones of said sectors, so that said sectors rotate on a plane parallel with the hatch until said sectors exit from said annular groove and allow the hatch to open.

3. The closing system as claimed in claim 2, wherein said one of the sectors that is fixed is positioned close to the hinge of the hatch.

4. The closing system as claimed in claim 3, wherein said sectors comprise one or more annular sectors that are hinged at either end to said fixed sector, said annular sectors being hinged to an articulated system consisting of two rods or connecting rods hinged together and to ones of said sectors, one of said rods being integral with an operating lever designed to control the movements of said sectors between a position in which they are arranged in said annular groove to form said locking ring as a continuous ring, and a position in which they exit completely from said annular groove.

\* \* \* \* \*